United States Patent Office 3,075,949
Patented Jan. 29, 1963

3,075,949
LINEAR POLYETHERS OF BIS(HYDROXYMETHYL) DURENE AND DIPHENOLS
John R. Caldwell, Kingsport, Tenn., assignor to Eastman Kodak Company, Rochester, N.Y., a corporation of New Jersey
No Drawing. Filed Dec. 11, 1959, Ser. No. 858,842
6 Claims. (Cl. 260—47)

This application relates to linear polyethers of 1,2,3,4,5,6 - hexamethylbenzene(3,6 - dimethyldurene or 4,6-dimethylisodurene) and a diphenol. They can be considered as being polyethers of bis(hydroxymethyl) durene. The isodurene derivatives are less advantageous.

Although many polyethers have been described in the prior art only a rather limited class of such polymers are linear in nature and an even narrower class is composed principally of aromatic radicals. The present invention especially relates to a new and improved sub-class of linear aromatic polyethers which derive their unobvious properties from the use of 3,6-dimethyldurene as a constituent.

It is an object of this invention to provide new aromatic linear polyethers that contain the 3,6- or 4,6-dimethyldurene nucleus. A further object of this invention is to provide linear aromatic polyethers which have exceptionally high softening points, especially when containing the 3,6-dimethyldurene constituent.

An additional object of this invention is to provide new linear aromatic polyethers that are characterized by exceptional stability toward thermal and hydrolytic degradation.

Another object of this invention is to provide new and useful films prepared from the polyethers of this invention which are valuable as a photographic film base, an electrical insulator and other purposes.

A further object of this invention is to provide new and useful fibers derived from the linear polyethers of this invention and to also provide molding plastics and other compositions therefrom.

Other objects will become apparent elsewhere herein.

In accordance with a principal embodiment of this invention there is provided a linear polyether of bis(hydroxymethyl)durene and a diphenol containing from 12 to 30 carbon atoms characterized by softening temperatures above 200° C., improved stability at such temperatures toward thermal degradation and improved stability toward hydrolytic degradation relative to polyethers of homologs.

These polyethers are characterized by exceptional stability toward thermal and hydrolytic degradation. In some cases the polyethers of this invention have melting points above 300° C. The products are useful for the manufacture of films, fibers, molding plastics and many other purposes including particular value as a photographic film base and as a dielectric for electrical condensers and the like. The properties which render such materials especially valuable are their uniform properties over wide temperature ranges whereby they can be employed for purposes such as still and motion picture photographic film projection without adverse effects caused by the high temperatures produced by the projection illumination. Likewise, when used as dielectrics in electrical components the uniformity of properties and stability to humidity and weathering conditions because of the resistance to hydrolytic degradation results in remarkably satisfactory performance.

Although linear polyethers have been produced from homologs of the components employed in accordance with the present invention, the linear aromatic polyethers so produced are characterized by properties which would not lead those skilled in the art to predict the results achieved in accordance with the present invention. The unobviousness of the particular linear aromatic polyethers of this invention is now apparent by reason of the disclosure herein. An especially unobvious embodiment of the present invention centers around the use of the particular diphenol employed as described in Example 2 hereinbelow.

The aromatic linear polyethers of this invention can be prepared in accordance with one aspect of this invention by reaction between bis(chloromethyl)durene and one or more diphenols in the presence of an acid-accepting agent such as an alkali metal hydroxide or alkoxide. Tertiary amines may also be used. Solvents such as the lower alcohols or dioxane can be employed advantageously. Other solvents which are useful include monochlorobenzene, dichlorobenzene and various other chlorinated hydrocarbons. Quaternary ammonium hydroxides can be employed as the acid-acceptor or as a catalyst in conjunction with other kinds of acid-accepting agents.

The bis(chloromethyl)durene employed in the condensation with the diphenol can be prepared by treating durene or isodurene with formaldehyde and hydrogen chloride as described in the prior art. The diphenols which are condensed with the bis(chloromethyl)durene contain two nuclear hydroxy groups on either a phenol ring or a fused ring system as represented by anthracene or naphthalene derivatives. A particularly useful class of diphenols is represented by the structure

Compounds in which X has the structure

may be made by condensing phenols with aldehydes and ketones as described in Angew. Chem. 68, 633 (1956). A particularly valuable class is represented by 4,4'-(2-norcamphanylidene) diphenol and 4,4'-(3a,5,6,7a-tetrahydro-4,7-methanoindan-6-ylidene) diphenol and related diphenols as described in a copending patent application filed by Caldwell and Jackson on September 14, 1961, Serial No. 137,980. X may also represent a direct bond, —O—, —S—, —SO₂—, —CONH—,

—N—
|
R

—(CH₂)ₙ— where $n$ is 2–4, —O—CH₂CH₂—O—,

, —O—CH₂— ⟨⟩ —CH₂—O— etc.

Thus diphenols which can be used include those having from 12 to 30 carbon atoms. When X in the above formula is a divalent hydrocarbon radical, it includes those selected from the group consisting of alkylene radicals containing from 1 to 4 carbon atoms and arylene radicals containing from 6 to 18 carbon atoms.

It is obvious that equivalent diphenols are also encompassed within the scope of the invention which are homologous to the compounds described or which contain other substituents such as halogen atoms.

This invention can be further illustrated by the following examples of preferred embodiments although it will be understood that these examples are included merely for purposes of illustration and are not intended to limit the scope of the invention unless otherwise specifically indicated.

*Example 1*

5.95 g. (0.0261 mole) of 4,4'-isopropylidene-diphenol was dissolved in 50 ml. of 0.0522 molar sodium ethoxide in ethanol. To this solution was added a slurry of 6.025 g. (0.0261 mole) of bis(chloromethyl)durene in 150 ml. of dioxane. The mixture was refluxed for 17 hours. The polymer separated as a white powder that was removed by filtration and washed with water.

The polymer was soluble in boiling tetrachlorethane and slightly soluble in boiling chlorobenzene. It was insoluble in alcohol, dioxane, dimethylformamide, and ethylene glycol monomethyl ether. It softened at 260° C. and melted somewhat above 300° C. Films made by hot pressing showed excellent resistance to thermal degradation at 200° C. The films are useful as photographic film base and as electrical insulators.

*Example 2*

Forty-six g. of sodium was dissolved in 1000 cc. of ethyl alcohol and 280 g. of 4,4'-(2-norcamphanylidene) diphenol was added. A slurry of 231 g. of bis(chloromethyl)durene in 500 cc. of dioxane was added and the mixture was refluxed for 20 hours. The alcohol and dioxane were distilled from the reaction mixture to leave a residue of polyether and sodium chloride. Six hundred g. of o-dichlorobenzene was added to the residue and the mixture was stirred at 140–160° for three hours to cause further polymerization. The mixture was then diluted with acetone and filtered to remove the dichlorobenzene. The cake was washed with acetone and then stirred with water to dissolve the sodium chloride.

The polymer softened at 280–300° C. It was pressed into clear, tough films at 330–360°. It is useful as an electrical insulator and a photographic film base.

*Example 3*

Bis(chloromethyl)isodurene and 4,4'-isobutylidene diphenol in equimolecular quantities were stirred at 50–60° C. in an excess of tributyl amine for 8 hours. The temperature was then raised to 100–120° and stirring was continued for 6 hours. The reaction mixture was poured into an aqueous 5% sulfuric acid solution and the polymer was removed by filtration. The product is useful as an electrical insulator.

*Example 4*

Forty-six g. of sodium was dissolved in 100 cc. of ethyl alcohol and 320 g. of 4,4'-(3a,5,6,7a-tetrahydro-4,7-methanoindan-6-ylidene) diphenol was added. A slurry of 231 g. bis(chloro-methyl)durene in 2,000 cc. dioxane was added and the mixture was ground in a ball mill at 80–100° for 24 hours. The alcohol and dioxane were distilled off to leave a residue of polyether and sodium chloride. Five hundred g. of o-dichlorobenzene was added to the residue and the mixture was stirred at 140–160° for three hours to cause further polymerization. The mixture was filtered and the residue was washed with acetone to remove dichlorobenzene. The cake was then boiled with water to remove the sodium chloride. The polymer softened at 300–320°. It is useful as an electrical insulator and as a photographic film base. It also is useful as a protective coating.

Other diphenols as defined above when condensed with bis(chloromethyl)durene produce aromatic linear polyethers having properties encompassed within the general description of the invention set forth above.

As mentioned above, the polyethers of this case are condensation polymers and according to customary language in the art can be considered as polyethers of the two theoretical materials being condensed although neither appears in the final product. Hence, these polyethers can be defined as polyethers of a bis(hydroxymethyl) durene and a bisphenol. They are characterized as already described and probably have molecular weights in excess of 7,500 and probably not greater than about 200,000. In any case they are highly polymeric.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A highly polymeric film-forming linear polyether having a softening temperature above 200° C. and having a molecular weight of from about 7,500 to about 200,000 which is essentially composed of recurring units having the following general formula:

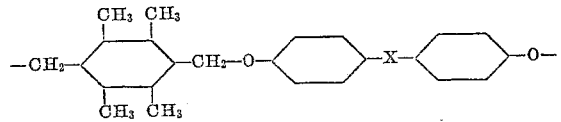

wherein X is a divalent hydrocarbon radical selected from the group consisting of alkylene radicals containing from 1 to 4 carbon atoms and arylene radicals containing from 6 to 18 carbon atoms.

2. A polyether as defined by claim 1 wherein X is an isopropylidene radical.
3. A polyether as defined by claim 1 wherein X is an isobutylidene radical.
4. A film of a polyether as defined by claim 1.
5. A film of a polyether as defined by claim 2.
6. A film of a polyether as defined by claim 3.

References Cited in the file of this patent

UNITED STATES PATENTS

| | | |
|---|---|---|
| 2,058,394 | Arvin | Oct. 27, 1936 |
| 2,330,722 | Lieber | Sept. 28, 1943 |
| 2,856,375 | Mikeska | Oct. 14, 1958 |